United States Patent Office 3,674,581
Patented July 4, 1972

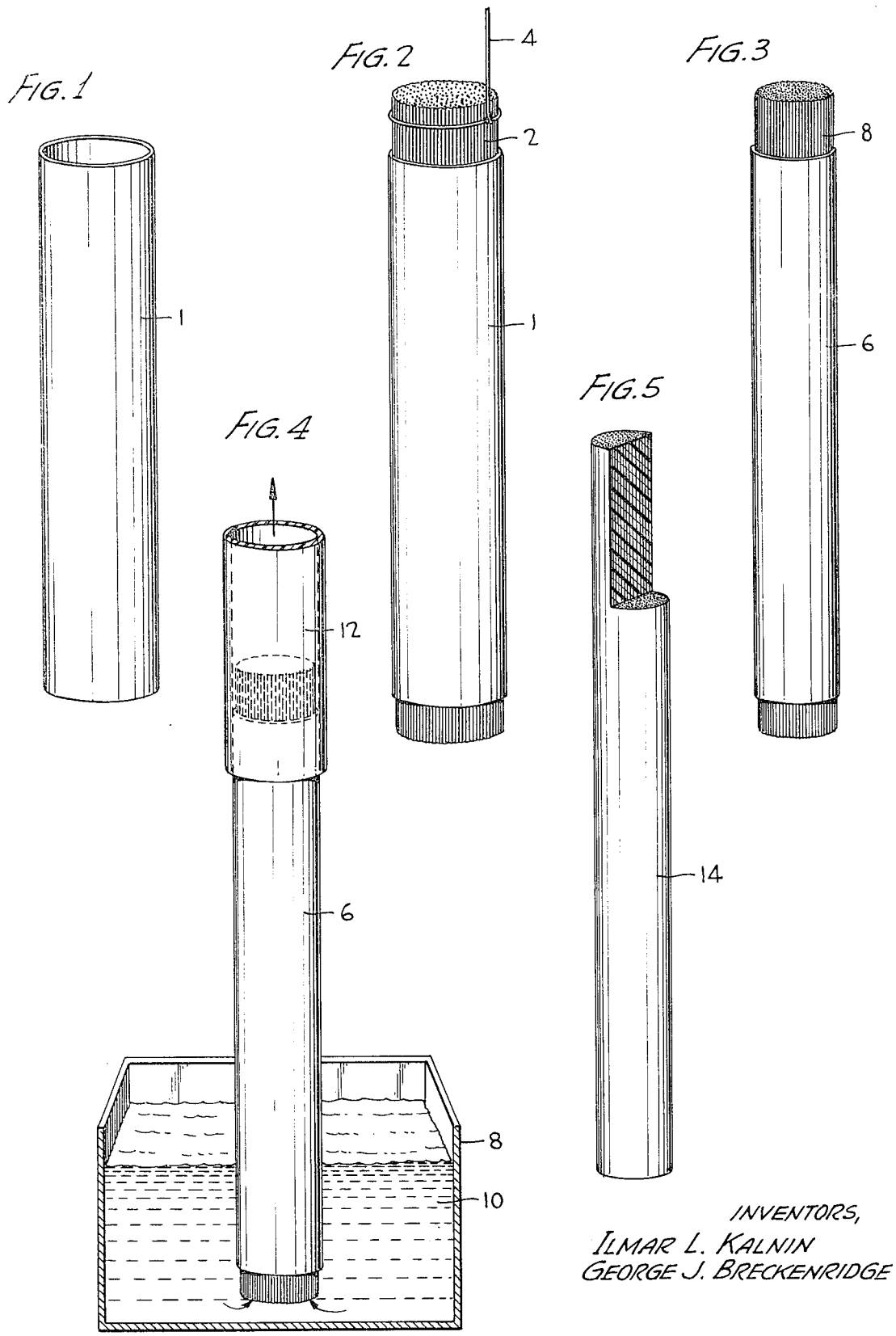

3,674,581
PRODUCTION OF FIBER REINFORCED COMPOSITES

Ilmar L. Kalnin, Millington, and George J. Breckenridge, Roselle, N.J., assignors to Celanese Corporation, New York, N.Y.
Filed Apr. 1, 1969, Ser. No. 812,192
Int. Cl. B29c 27/00
U.S. Cl. 156—84  9 Claims

ABSTRACT OF THE DISCLOSURE

An improved process is provided for the formation of essentially solid fiber reinforced composite bodies. The process is particularly suited for the formation of composite bodies having a high volume of fibrous reinforcing medium (e.g. carbonaceous filaments) distributed in a matrix (e.g. an epoxy resin) in a highly oriented relationship. In the production of composite bodies the fibrous reinforcing medium while present within a heat-shrinkable mold is compacted by the application of heat and a flowable matrix-forming material subsequently is introduced into the mold and solidified to a moldable B-stage or rigid C-stage consistency. The essentially solid composite bodies formed according to the invention are useful in the formation of high performance structural elements or as high performance structural elements.

BACKGROUND OF THE INVENTION

Through the years numerous techniques have been proposed for the production of fiber reinforced composites. Currently, interest in the efficient production of such composites has been intensified largely because of the added requirements of the areospace industry for high performance composite. For instance, it is generally recognized that fiber reinforced composites may be selected for use as high strength structural components while possessing only a fraction of the weight of more conventional materials commonly employed in the same or similar applications.

Heretofore, difficulties have been encountered when attempts have been made to form solid composites which exhibit a relatively high volume ratio of fibrous reinforcing medium to matrix. Such difficulties have been particularly acute when individual fibers of the fibrous reinforcing medium are of relatively small diameter, porous, or have a high elastic modulus that renders them more sensitive to breakage or other damage when attempts are made to introduce a large quantity of the same into a conventional mold. Illustrative examples of fibrous reinforcing materials which are particularly prone to damage upon their introduction in large quantities into a mold body are carbon and graphite fibrous materials, boron fibers, glass fibers, and various other types of ceramic fibers or whiskers, e.g. sapphire, silicon carbide, etc.

It has been proposed in the past that fibrous materials together with a liquid matrix-forming material may be compressed within a mold of heat-shrinkable tubing upon the application of heat. See, for instance, U.S. Pat. No. 3,198,059 to Phaneul et al. While such a technique has compacted the fibrous reinforcing medium, it has had definite limitations. When the matrix-forming material is a thermosetting resin, such as an epoxy, the resin tends to cure or harden upon the application of heat required to shrink the tubing. Shrinkage is accordingly retarded as is the flow of resin to and from the confines of the mold. Void formation within the composite structure tends to occur as the matrix-forming material becomes viscous and its flow is retarded. There has also been observed a tendency for some portions of the matrix to set faster than other portions which may result in a distorted product since uniform shrinkage of the mold is rendered impossible. Excess matrix-forming material which is exuded from the mold must be collected, and if already partially cured may be unsuitable for further use in the process and accordingly discarded.

It is an object of the invention to provide an improved process for the production of fiber reinforced composite bodies.

It is an object of the invention to provide an improved process for the production of solid fiber reinforced composite bodies having superior physical properties.

It is an object of the invention to provide an improved process for the production of solid fiber reinforced composite bodies having a relatively high volume ratio of fibrous reinforcing medium to matrix.

It is another object of the invention to provide an improved process for the production of solid fiber reinforced composite bodies having a minimal void content, and an improved torsional shear strength and shear modulus.

It is another object of the invention to provide a process which is particularly suited for the production of elongated composite bodies having a reinforcing medium of a plurality of filaments which are in a highly oriented relationship.

It is a further object of the invention to provide an improved composite body comprising a fibrous reinforcing medium and a resinous matrix.

It is a further object of the invention to provide an improved composite body comprising a fibrous carbonaceous reinforcing medium and an epoxy resin matrix.

It is a further object of the invention to provide an improved composite body comprising a carbonaceous fibrous reinforcing medium and a thermoplastic resin matrix.

It is an additional object of the invention to provide an improved prepreg fiber reinforced composite body which is of a moldable consistency.

These and other objects, as well as the scope, nature, and utilization of the invention will be apparent to those skilled in the art from the drawings, the following detailed description of the invention, and the appended claims.

SUMMARY OF THE INVENTION

It has been found that an improved process for the production of a fiber reinforced composite body comprises: (a) providing a heat-shrinkable mold which is capable of a substantial decrease in volume while assuming a predetermined configuration upon the application of heat, (b) positioning a fibrous reinforcing meduim within the confines of the heat-shrinkable mold, (c) heating the heat-shrinkable mold containing the fibrous reinforcing medium until the volume of the mold is substantially decreased and the fibrous reinforcing medium present therein is compacted, (d) introducing subsequently a flowable matrix-forming material into the resulting mold until the reinforcing medium present therein is in intimate contact with the matrix-forming material, and (e) solidifying the matrix-forming material. In a preferred embodiment of the invention an essentially solid composite body may be formed comprising a matrix material in an amount from about 25 to 60 percent by volume, and carbonaceous filaments distributed therein in a highly oriented relationship in an amount from about 40 to 75 percent by volume.

DESCRIPTION OF THE DRAWINGS

FIG. 1 is a perspective view of a section of heat-shrinkable tubing suitable for use as the heat-shrinkable mold in the present process.

FIG. 2 shows the positioning of a bundle of fibrous reinforcing medium within the heat-shrinkable tubing of FIG. 1.

FIG. 3 shows the configuration of the tubing and reinforcing medium of FIG. 2 subsequent to heat treatment.

FIG. 4 shows the resulting mold of FIG. 3 while immersed in a resin bath and connected to a vacuum pump.

FIG. 5 shows the product of the invention partially cut away subsequent to the removal of the shrunken tubing.

DETAILED DESCRIPTION OF THE INVENTION

The heat-shrinkable mold which is selected for use in the present process is capable of a substantial decrease in volume, e.g. about 25 to 75 percent, to assume a predetermined configuration upon the application of heat. The volume and configuration of the mold may be varied widely. The shape and size of the mold is largely dictated by the dimensions of the desired composite body and is such that one may impregnate substantially all portions of the same with a flowable matrix-forming material subsequent to the heat-shrink step while containing a compacted fibrous reinforcing medium as discussed in detail hereafter. The sides of the mold may be substantially impervious to liquids and gases or alternatively be provided with a plurality of pores through which to introduce the matrix-forming material. It is recommended that the mold be of a composition that will readily release from the resulting reinforced composite body in those instances where the mold is to be discarded following the formation of the composite body. Alternatively, conventional mold release agents may be selected.

In a preferred embodiment of the invention, the mold is a length of heat-shrinkable tubing. Such tubing, which is commonly referred to as "shrink tubing," is commercially available and is frequently used to encapsulate electronic components. The tubing, which may be formed from an organic polymeric material, may be either thermoplastic or thermosetting in nature. Illustrative examples of suitable organic polymeric materials include polyolefins, polyvinylidene fluoride, polytetrafluoroethylene, polyvinylchloride, etc. Polyolefin tubes of polyethylene or polypropylene are particularly preferred for use in the process. The diameter and wall thickness of the tubing may be varied widely. It is recommended, however, that the tubing be of a size and rigidity which is capable of retaining its cylindrical shape throughout the heating step of the process in which the volume of the tube is decreased. For instance, suitable heat-shrink tubing prior to use in the process may range in outer diameter from about 0.25 inch to about 2 inches, and have an initial wall thickness from about 0.015 inch to about 0.100 inch. Heat-shrinkable molds may also be selected for use in the process which have other simple basic cross-sections, e.g. square, rectangular, triangular, elliptical, etc. If desired, a transparent heat-shrinkable mold may be selected so that introduction of the flowable matrix-forming material as discussed hereafter may be visually observed. When it is intended to permanently retain the mold about the composite body during use in applications where appearance is of importance, the mold may be provided in various colors.

The fibrous reinforcing medium used in the process may be selected from a variety of materials. For instance, the reinforcing medium may be carbonaceous fibers, glass fibers, asbestos fibers, boron fibers, alumina silicate fibers, sapphire fibers, silicon carbide fibers, high tenacity organic fibers, e.g., highly oriented regenerated cellulose fibers sold under the designation Fortisan by the Celanese Corporation, etc. It is preferred that the fibrous reinforcing medium be formed of continuous filaments of appreciable length, however, staple fibers, whiskers, or fabrics may also be utilized. Also, it is highly desirable that the reinforcing medium selected be capable of forming an adherent bond with the matrix-forming material which is employed in the process and for this purpose it may be coated or surface treated prior to its utilization by conventional techniques. If desired, the reinforcing medium may be introduced within the mold as one or more bundles, yarns, or strands preferably formed from individual essentially continuous filaments. Such yarns or strands may be more conveniently handled than a plurality of uncombined filaments. In a preferred embodiment of the process, the reinforcing medium is carbonaceous in nature (i.e. contains at least about 90 percent carbon by weight). In a particularly preferred embodiment of the invention the fibrous material is formed primarily of graphitic carbon which may be detected by the characteristic X-ray diffraction pattern of graphite. Essentially continuous carbonaceous filaments for use in the process may be formed in accordance with the teaching of U.S. Ser. No. 777,275, filed Nov. 20, 1968 of Charles M. Clarke, which is assigned to the same assignee as the instant invention and is herein incorporated by reference. Carbonaceous filaments formed by other techniques may also be selected for use in the present process.

The reinforcing medium is positioned within the heat-shrinkable mold in any convenient manner. For instance, the end of a bundle of essentially continuous filaments may be tied and pulled within a length of heat-shrinkable tubing. In this manner, up to approximately 20 to 40 percent by volume of the mold may be occupied by the reinforcing medium without resorting to packing techniques which cause undue breakage of the individual filaments or impair their essentially parallel alignment. In a further embodiment of the invention, the reinforcing medium in the form of staple fibers or whiskers may be poured into the heat-shrinkable mold where the individual fibers assume a random arrangement. Directional alignment of a random fiber arrangement may be achieved by subjecting the short fibers or whiskers to a vibratory or centrifuging action accomplished by inserting the filled mold in conventional apparatus. A fabric or cloth fibrous reinforcing medium may be rolled and inserted in the mold prior to the heat-shrinking.

Heat is next applied to the heat-shrinkable mold until the volume of the mold is substantially decreased, e.g. about 25 to 75 percent, and the fibrous reinforcing medium present therein compacted and consolidated. Such controlled compaction is conducted without an appreciable decrease in the physical properties of the individual fibers making up the reinforcing medium. Heat to shrink the mold may be applied in any convenient manner such as by positioning the same within a conventional oven having a controlled reasonably constant temperature. The temperature selected is influenced by the degree of heating required to cause the controlled shrinkage of the mold, and the temperature which the fibrous reinforcing medium is capable of withstanding. For instance, polyolefin shrink-tubing may be conveniently shrunk at a temperature within the range of about 130° C. to 160° C. in about 10 to 20 minutes. Carbonaceous fibrous materials may be heated while in contact with an oxygen containing atmosphere at temperatures up to about 450° C. without deleterious results. Much higher temperatures may be withstood by such carbonaceous materials provided oxygen is excluded from the atmosphere. When fabricating cylindrical or tubular products it is recommended that the mold be in a vertical position during the heating so that uniform shrinkage and circularity is promoted, and the mold surfaces uniformly heated.

The flowable matrix-forming material may generally be selected from those materials utilized in the production of fiber reinforced composites by prior art techniques. Thermosetting resins, particularly those which are capable of withstanding elevated long-term use temperatures, e.g. above about 100° C., are preferred for use in the process. Illustrative examples of suitable thermosetting resins include epoxy resins, polyesters, phenolics, polyimides, polybenzimidazoles, etc. Illustrative examples of thermoplastic matrix-forming materials which may be utilized in the process include phenoxy resins, polysulfones, polyamides, polyoxymethylenes, etc.

An epoxy resin is the preferred matrix-forming material for use in the process of the invention. For best results, it is recommended that an uncured epoxy resin be selected which is inherently liquid at about room temperature or which may be modified to possess flowable properties at about room temperature by the addition of conventional modifiers or diluents. Numerous modifiers, diluents, or flexibilizers of both the reactive and non-reactive types are well known and include butyl glycidyl ether, higher molecular weight glycidyl ethers or mixtures thereof, and furfural alcohol. When epoxy resin modifiers or diluents of the reactive type are utilized, the volume of the simple epoxy resin plus the volume of the chemically combined reactive diluent or modifier is considered the volume of the epoxy resin for purposes of this invention disclosure, as is the volume of the curing agent discussed hereafter, unless otherwise indicated.

The epoxy resins utilized in the present invention are most commonly prepared by the condensation of bisphenol A (4,4' isopropylidene diphenol) and epichlorohydrin. Also, other polyols, such as aliphatic glycols and novolac resins may be reacted with epichlorohydrin for the production of epoxy resins suitable for use in the instant process provided resinous products are selected which possess the requisite flow properties.

In a preferred embodiment of the invention epoxy resins are selected which possess terminal epoxide groups and are condensation products of bisphenol A and epichlorohydrin of the following formula:

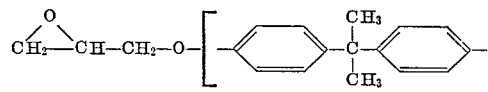 

where $n$ varies between zero and a small number less than about 10. When $n$ is zero, the resin is a very fluid light-colored material which is essentially the diglycidyl ether of bisphenol A. As the molecular weight increases so generally does the viscosity of the resins. Accordingly, the particularly preferred liquid epoxy resins generally possess an $n$ value averaging less than about 1.0. Epoxy novolacs, as well as epoxy cycloaliphatics may also be selected. Illustrative examples by standard trade designations of particularly useful commercially available epoxy resins include: Epi-Rez 508, Epi-Rez 510, and Epi-Rez 5155 (Celanese Coatings Company); DER 332, and DEN 438 (Dow Chemical Company); Epon 828, and Epon 1031 (Shell Chemical Company); and ERLA 2256 (Union Carbide).

A variety of epoxy resin curing agents may be used in the process as an essential component of the epoxy resin matrix-forming material. The curing or hardening of the epoxy resin typically involves further reaction of the epoxy or hydroxy groups to cause molecular chain growth and cross linking. The term "curing agent" as used herein is accordingly defined to include the various hardeners of the co-reactant type. Illustrative classes of known epoxy curing agents which may be utilized in the process include aliphatic and aromatic amines, polyamides, tertiary amines, amine adducts, acid anhydrides, acids, aldehyde condensation products, and Lewis acid type catalysts, such as boron trifluoride. The preferred epoxy curing agents for use in the process are hexahydrophthalic anhydride; methylbicyclo[2.2.1]heptene - 2,3-dicarboxylic anhydride isomers marketed under the designation Nadic Methyl Anhydride (Allied Chemical Co.); 2-ethyl, 4-methyl imidazole marketed under the designation of EMI–24 (Air Products and Chemicals, Inc.); and aromatic amines (e.g. meta phenylene diamine and dimethylaniline) marketed under the designation Epi-Cure 841 (Celanese Coatings Co.).

The flowable matrix-forming material is introduced into the resulting mold following the heat-shrink step so that intimate contact is made with the surfaces of the individual fibers of the reinforcing medium, and the remaining interstices between the fibers are filled. In a preferred embodiment of the invention the matrix-forming material is introduced by use of a pressure differential, i.e. the resulting mold may be attached to a source of vacuum and the flowable matrix-forming material drawn into the same, or above atmospheric pressure acting upon a body of the flowable material may be used to drive the material within the resulting mold when the mold is contacted with the same. The flowable matrix-forming material enters the resulting mold through one or more apertures provided in the walls of the same. For instance, when shrink-tubing is utilized, the matrix-forming material may conveniently enter one of the ends of the tubing. As previously indicated, it is also possible that the heat-shrinkable mold be provided with a plurality of pores through which the matrix-forming material may enter. The time required to essentially completely fill the interstices with the matrix-forming material is dependent upon the introduction technique employed, the number and size of the apertures in the mold, and the relative volume of the mold occupied by the fibrous reinforcing medium. For instance, the more dense the fibrous reinforcing medium, the more time will be required for the flowable matrix-forming material to permeate the interstices. If desired, the matrix-forming material may be introduced while at an elevated temperature so that it is less viscous and capable of more rapid penetration. The elevated temperature utilized must be such that the reinforcing properties of the fibrous material present within the mold are not adversely influenced. A supporting rigid sheath may optionally be placed around at least a portion of the mold prior to the introduction of the matrix-forming material should the resulting mold be incapable of preserving its desired configuration at the temperatures employed. A flowable uncured epoxy resin is preferably at a temperature of about 40 C. to 80 C. at the time of its introduction.

When the flowable matrix-forming material is an epoxy resin system, a non-reactive, low viscosity, low boiling diluent, such as acetone, may be included to decrease the viscosity of the system and thus increase the impregnation rate. By placing the mold under vacuum during the impregnation step while simultaneously applying moderate heating, all of the diluent may be removed by evaporation. If possible, it is preferred, however, to avoid the use of a non-reactive diluent which must be removed by evaporation.

Immediately prior to the introduction of the flowable matrix-forming material, it is recommended that volatiles be removed from the fibrous reinforcing medium so that good adhesion with the same is promoted. Such degassing and moisture removal may be preformed by techniques such as heating in air above 100 C., e.g. 100 C. to 200 C., or preferably under partial vacuum at 75 C. to 100 C. for at least 15 minutes. Products formed employing a carbonaceous fibrous reinforcing medium and an epoxy matrix will exhibit significantly improved adhesion between the reinforcing medium and matrix if the reinforcing medium is present in an essentially devolatilized form immediately prior to the introduction of the flowable matrix-forming material. When the matrix-forming material is introduced immediately following the heat-shrinkable step, a separate degassing step may be avoided.

Once the introduction of the flowable matrix-forming material is complete, it is solidified to at least a tacky consistency. When thermosetting resins are employed to form the matrix, heat may be applied by any convenient means to expedite solidification or curing of the same. For instance, the resulting mold containing the matrix-forming material may be simply placed in an oven. As previously indicated in connection with the introduction of the matrix-forming material, a rigid sheath may optionally be placed around at least a portion of the mold to preserve its desired configuration during the solidification step.

It is possible through the use of the present process to partially cure a thermosetting matrix-forming material present in intimate association with the fibrous reinforcing medium to a B-stage or prepreg consistency. The resulting composite containing a partially cured thermosetting resin may then be stored for future use or molded to a different or more complex configuration, e.g. I-beams, box beams, etc. A B-stage thermosetting resin is defined as a partially cured or advanced thermosetting resin which has neither the consistency of a flowable liquid, nor the consistency of a rigid solid. A B-stage thermosetting resin is accordingly soft and tacky in its consistency and may be readily molded. Upon the passage of time even at room temperature, a B-stage thermosetting resin will assume a C-stage consistency. This conversion from a B-stage consistency to a completely gelled C-stage consistency is accelerated or advanced by heat.

The temperature and heating duration required to form a B-stage or C-stage thermosetting resin within the composite varies with the particular resins selected as will be apparent to those skilled in the art. When epoxy resins are selected as the matrix-forming material, curing (either partial or complete) is generally conducted at an elevated temperature of about 80 C. to 200 C. To form a B-stage or partially cured product employing an epoxy matrix, heating is generally conducted for about 15 to 45 minutes. To form a C-stage or completely gelled product employing an epoxy matrix, heating is generally conducted for about 2 to 10 hours. During the latter portion of the curing cycle the temperature preferably is elevated over the curing temperature initially employed.

Through the use of the present process, rigid or flexible essentially solid composite bodies may be formed comprising a matrix material in an amount from about 25 to 60 percent by volume, and a fibrous reinforcing medium in an amount from about 40 to 75 percent by volume. In a preferred embodiment of the invention, carbonaceous filaments are distributed in the matrix in a substantially oriented alignment in an amount from about 40 to 75 percent by volume. Depending upon the degree of solidification, the product may be of a B-stage consistency which is suitable for further molding, or of a rigid C-stage consistency. In a particularly preferred embodiment of the invention, a rigid essentially solid elongated composite body is formed comprising an epoxy resin in an amount from about 25 to 50 percent by volume, and carbonaceous filaments (e.g. graphite filaments) distributed in the epoxy resin in a substantially parallel alignment with the length of the body in an amount from about 50 to 75 percent by volume. Representative composites formed according to the present invention have been found to possess the following highly desirable physical properties: high fiber density, good compressive properties, good torsional shear strength, and high modulus of rigidity.

The present invention is particularly suited for forming elongated composites having a rod or pipe configuration. By positioning a cylindrical core within the axial center of a length of heat-shrinkable tubing during the composite formation, high strength pipes or conduits may be formed. Following the formation of the composite, the mold may be optionally removed. Alternatively, a composite core may be positioned within the center of a length of heat-shrinkable tubing and serve as a permanent portion of the composite. Continuous lengths of fibrous materials, such as carbonaceous or graphitic yarns may be helically filament wound around a permanent or temporary core, and then compacted by shrinkage of a heat-shrinkable mold and subsequently impregnated with a matrix-forming material. If desired, the surfaces of the composites may be machined to form articles of intricate shapes or of precise dimensions.

The products of the invention find utility as structural elements. In many of the embodiments of the invention, the products find particular utility in the aircraft and aerospace industries because of their light weight, and their high unidirectional strength, torsional shear, and shear modulus.

The following examples are given as specific illustrations of the invention. It should be understood, however, that the invention is not limited to the specific details set forth in the examples. Reference is made in the examples to FIGS. 1 through 5 of the drawings.

EXAMPLE I

A section of heat-shrinkable polyolefin tubing 1 having an outer diameter of 0.75 inch and an inner diameter of 0.69 inch was selected as the heat-shrinkable mold for use in the process. The tubing was marketed by the Raychem Company under the designation Thermofit RNF 100.

A filament bundle of carbonaceous filaments 2 calculated to give approximately 50 percent by volume reinforcement to the finished rod and consisting primarily of graphitic carbon was tied at one end with string 4 and gently pulled within the confines of the section of heat-shrinkable tubing 1. The carbonaceous yarn 2 was marketed by the Union Carbide Co. under the designation Thornel 40 and occupied approximately 25 percent of the total volume of the heat-shrinkable tubing 1.

String 4 was removed and heat-shrinkable tubing 1 containing the carbonaceous filaments 2 was placed within a thermostatically controlled air oven maintained at 140°±5° C. for 15 minutes. During this period of time the tubing shrank to an outer diameter of approximately 0.58 inch and an inner diameter of approximately 0.52 inch as shown in FIG. 3. The resulting tubing 6 contained compacted and consolidated carbonaceous filaments 8 therein in a quantity which amounted to approximately 51 percent of its new volume.

The resulting tubing 6 and its contents 8 were degassed by heating in air at 110° C. for 15 minutes.

As shown in FIG. 4, an end of the resulting tubing 6, subsequent to degassing was then positioned within a container 8 containing a liquid uncured epoxy resin system 10 maintained at 65° C. The epoxy resin system included approximately 100 parts by weight of a condensation product of bisphenol A and epichlorohydrin marketed by the Celanese Coatings Company under the designation Epi-Rez 508, and 27 parts by weight of a mixture of aromatic amine curing agents (i.e. meta phenylene diamine and dimethylaniline) marketed by the Celanese Coatings Company under the designation Epi-Cure 841. A connecting tube 12 in communication with a vacuum pump (not shown) was attached to the resulting tubing 6, and the liquid epoxy resin system 10 was drawn within the tubing in intimate contact with the carbonaceous filaments until the reinforcement was covered with the resin.

The tubing containing the epoxy resin was next placed in a thermostatically controlled oven containing an air atmosphere where it was heated for 2 hours at 80° C., and 4 hours at 160° C. for complete curing. During this period, the epoxy resin hardened to form a rigid essentially solid rod consisting of approximately 49 percent epoxy resin by volume, and having approximately 51 percent by volume carbonaceous filaments distributed therein in a substantially parallel alignment with the length of the rod.

The outer polyolefin tubing was removed and the rod was machined to a uniform diameter of 0.50 inch as shown in FIG. 5. The resulting rod 14 was next cut into 3–4 inch test sections and its physical properties were determined. The composite body was found to exhibit the following properties:

| | |
|---|---|
| Density | 1.39 g./cm.$^3$. |
| Fiber content | 51 percent by volume. |
| Torsional shear strength | 3800 p.s.i. |
| Modulus of rigidity | 490,000 p.s.i. |
| Ultimate compressive strength | 39,000 p.s.i. |
| Compressive modulus | 22,200,000 p.s.i. |

EXAMPLE II

Example I was repeated subject to the following modifications.

A section of heat-shrinkable polyolefin tubing having an outer diameter of 0.50 inch and an inner diameter of 0.45 inch was selected for use in the process. The tubing was marketed by the Raychem Company under the designation Thermofit RNF 100.

A high modulus graphite fiber bundle available from Morganite Research and Development, Ltd. under the designation Morganite II was selected as the fibrous reinforcing medium. The fiber bundle occupied approximately 35 percent by volume of the tubing volume prior to shrinkage and represented close to the maximum bundle size which could be conveniently introduced into the tubing without incurring damage to the yarn.

The heat-shrinkable tubing containing the fiber bundle was placed in a thermostatically controlled air oven maintained at 145° C. for 15 minutes during which time it shrank to an outer diameter of 0.45 inch and an inner diameter of 0.37 inch. The resulting tubing contained compacted and consolidated carbonaceous filaments therein in a quantity which amounted to approximately 63 percent of its new volume.

The tubing containing the fiber bundle was clamped at one end, attached to vacuum system at the opposite end, and degassed under vacuum at 80° C. for 30 minutes.

The clamp was removed from the tubing, and the tubing was inserted in a liquid uncured epoxy resin system. The epoxy resin system contained 100 parts by weight of a condensation product of bisphenol A and epichlorohydrin marketed by the Celanese Coatings Company under the designation Epi-Rez 508, 70 parts by weight of hexahydrophthalic acid anhydride curing agent, and 1 part by weight of benzyldimethylamine which served as an accelerator.

The tubing containing the epoxy resin was next placed in a thermostatically controlled oven containing an air atmosphere where it was heated for 2 hours at 100° C. and 2 hours at 200° C. During this period, the epoxy resin hardened to form a rigid essentially solid rod consisting of approximately 37 percent epoxy resin by volume, and approximately 63 percent by volume carbonaceous filaments distributed therein in a substantially parallel alignment.

The outer polyolefin tubing was removed and the rod was machined to a uniform diameter of 0.25 inch and evaluated for its physical and mechanical properties. The values obtained were as follows:

| | |
|---|---|
| Density | 1.60 g./cm.$^3$. |
| Fiber content | 63 percent by volume. |
| Torsional shear strength | 11,700 p.s.i. |
| Modulus of rigidty | 790,000 p.s.i. |

EXAMPLE III

Example I was repeated subject to the following modifications.

Immediately subsequent to the introduction of the epoxy resin system within the shrunken and degassed tubing containing the filament bundle, the tubing and its contents were heated at 120° C. for 20 minutes to form a partially cured B-stage product. The epoxy resin system was soft and tacky in consistency, and was neither the consistency of a flowable liquid, nor of a rigid solid.

The prepreg product still contained within the deformable polyolefin tubing was next inserted in a heated rectangular, ¼ inch wide matched steel die, and totally cured at a temperature of 160° C., and a pressure of 1000 p.s.i. for 4 hours. The resulting rectangular product was ¼ inch wide and ⅛ inch thick, and contained approximately 50 percent epoxy resin by volume, and had approximately 50 percent by volume of carbonaceous filaments distributed therein in a substantially parallel alignment with the length of the rectangular rod. The product had a density of about 1.4 g./cm.$^3$ and a flexural strength of about 80,000 to 110,000 p.s.i.

EXAMPLE IV

Example I was repeated substituting a glass fiber roving for the filament bundle of carbonaceous filaments.

EXAMPLE V

Example I was repeated substituting a roving of high strength regenerated cellulose for the filament bundle of carbonaceous filaments. The roving was marketed under the designation Fortisan by the Celanese Corporation.

Although the invention has been described with preferred embodiments, it is to be understood that variations and modifications may be resorted to as will be apparent to those skilled in the art. Such variations and modifications are to be considered within the purview the scope of the claims appended hereto.

We claim:

1. An improved process for the production of an elongated carbon fiber reinforced composite body suitable for use as a high strength structural element comprising:
   (A) providing a length of heat-shrinkable tubing which is capable of a substantial decrease in diameter while retaining a tubular configuration upon the application of heat,
   (B) positioning a fibrous reinforcing medium capable of undergoing substantial lateral compaction consisting essentially of a plurality of substantially continuous carbonaceous filaments having a carbon content of at least 90 percent by weight within said heat-shrinkable tubing in substantial alignment with the length of said heat-shrinkable tubing wherein the length of said carbonaceous filaments approximates the length of said heat-shrinkable tubing and the outer periphery of said fibrous reinforcing medium approximates the inner diameter of said heat-shrinkable tubing and is in contact therewith,
   (C) heating said heat-shrinkable tubing containing said carbonaceous filaments until the diameter of said tubing is substantially decreased and the volume of said tubing is decreased to about 25 to 75 percent of its original volume and said carbonaceous filaments present therein are substantially compacted,
   (D) introducing subsequently a flowable matrix-forming material into the resulting tubing until the carbonaceous filaments present therein are in intimate contact with the matrix-forming material substantially coextensive with their length, and
   (E) solidifying said matrix-forming material to form an elongated substantially void-free composite article which comprises about 25 to 60 percent by volume of said matrix and about 40 to 75 percent by volume of said substantially continuous substantially aligned carbonaceous filaments.

2. A process according to claim 1 wherein said heat-shrinkable tubing is a polyolefin.

3. A process according to claim 1 wherein said essentially continuous carbonaceous filaments are graphitic carbon.

4. A process according to claim 1 wherein said flowable matrix-forming material comprises a thermosetting resin.

5. A process according to claim 4 wherein said thermosetting resin is an epoxy resin.

6. A process according to claim 1 wherein said flowable matrix-forming material is introduced into the resulting tubing by use of a pressure differential.

7. A process according to claim 4 wherein said thermosetting resin is solidified by the application of heat.

8. A process according to claim 1 which includes the additional step of removing the resulting tubing subsequent to the solidification of the matrix-forming material.

9. A process according to claim 1 in which said carbonaceous filaments are in an essentially completely devolatilized form immediately prior to introducing said flowable matrix-forming material.

References Cited

UNITED STATES PATENTS

| | | | |
|---|---|---|---|
| 2,951,006 | 8/1960 | Rubenstein | 156—84 |
| 3,183,143 | 5/1965 | Harris | 156—180 |
| 3,301,648 | 1/1967 | Sheldon | 156—85 |

OTHER REFERENCES

Science Journal, 5, No. 2, February 1969, pp. 39 to 49.

BENJAMIN A. BORCHELT, Primary Examiner

D. BENT, Assistant Examiner

U.S. Cl. X.R.

156—85, 180